United States Patent [19]

Ryan

[11] 3,761,808
[45] Sept. 25, 1973

[54] TESTING ARRANGEMENT
[75] Inventor: Robert B. Ryan, Timonium, Md.
[73] Assignee: AAI Corporation, Cockeysville, Md.
[22] Filed: July 8, 1970
[21] Appl. No.: 56,157

Related U.S. Application Data
[63] Continuation of Ser. No. 744,804, July 15, 1968, abandoned.

[52] U.S. Cl............................. 324/73 R, 324/158 F
[51] Int. Cl....................... G01r 15/12, G01r 31/26
[58] Field of Search..................... 324/158 F, 158 R, 324/158 P, 73 R

[56] References Cited
UNITED STATES PATENTS
| | | | |
|---|---|---|---|
| 3,412,333 | 11/1968 | Frick et al. | 324/158 F |
| 3,560,849 | 2/1971 | Ryan et al. | 324/73 R |
| 3,274,534 | 9/1966 | Shortridge | 324/158 P |

OTHER PUBLICATIONS
Reich, B., Semiconductor Products, V. 5, No. 11, Nov. 1962, pgs. 24–27.

*Primary Examiner*—Rudolph V. Rolinec
*Assistant Examiner*—Ernest F. Karlsen
*Attorney*—Reginald F. Pippin, Jr.

[57] ABSTRACT
An environmental chamber and test transport apparatus is disclosed for automatically testing a plurality of packaged integrated circuits. A plurality of packaged integrated circuits are fed from a loaded magazine onto a transport tape which carries them into a nonconductive temperature controlled fluid bath to a test station submerged in the bath. As each packaged integrated circuit reaches the test station, its progressive movement is stopped and the circuit package is laterally engaged with a test head having dual rows of oppositely paired contacts each of which is electrically connected to a tester adapted to apply selected electrical signals to selected contacts and sense the result thereof to determine the electrical condition of the integrated circuit placed on the test head. The contacts are upwardly resiliently biased and protrude through the surface of the test head towards each other. Through engagement of the leads of the packaged integrated circuit with the upwardly protruding ends of the resiliently biased test contacts, the ends of the test contacts are displaced laterally in two directions relative to the direction of motion of the packaged integrated circuit, thereby producing a lateral wiping motion that scrapes away or materially reduces an oxide film which may be present on either the packaged integrated circuit leads or the ends of the test contacts, to effect a reliable electrical connection therebetween with minimum impedance which might otherwise be greater from the presence of an oxide film, thereby desirably achieve a more accurate testing operation. When the test operation is completed, the packaged integrated circuit is removed from the test head and again carried by the transport tape away from the test station to an output section where it is collected in an empty magazine.

6 Claims, 5 Drawing Figures

United States Patent [19]
Ryan
[11] 3,761,808
[45] Sept. 25, 1973
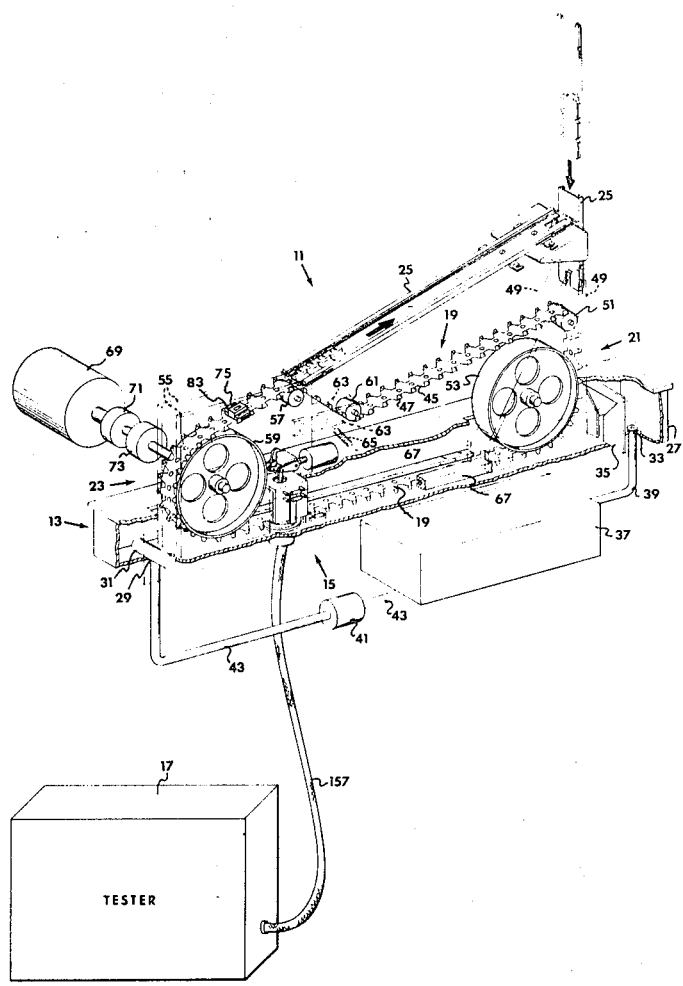

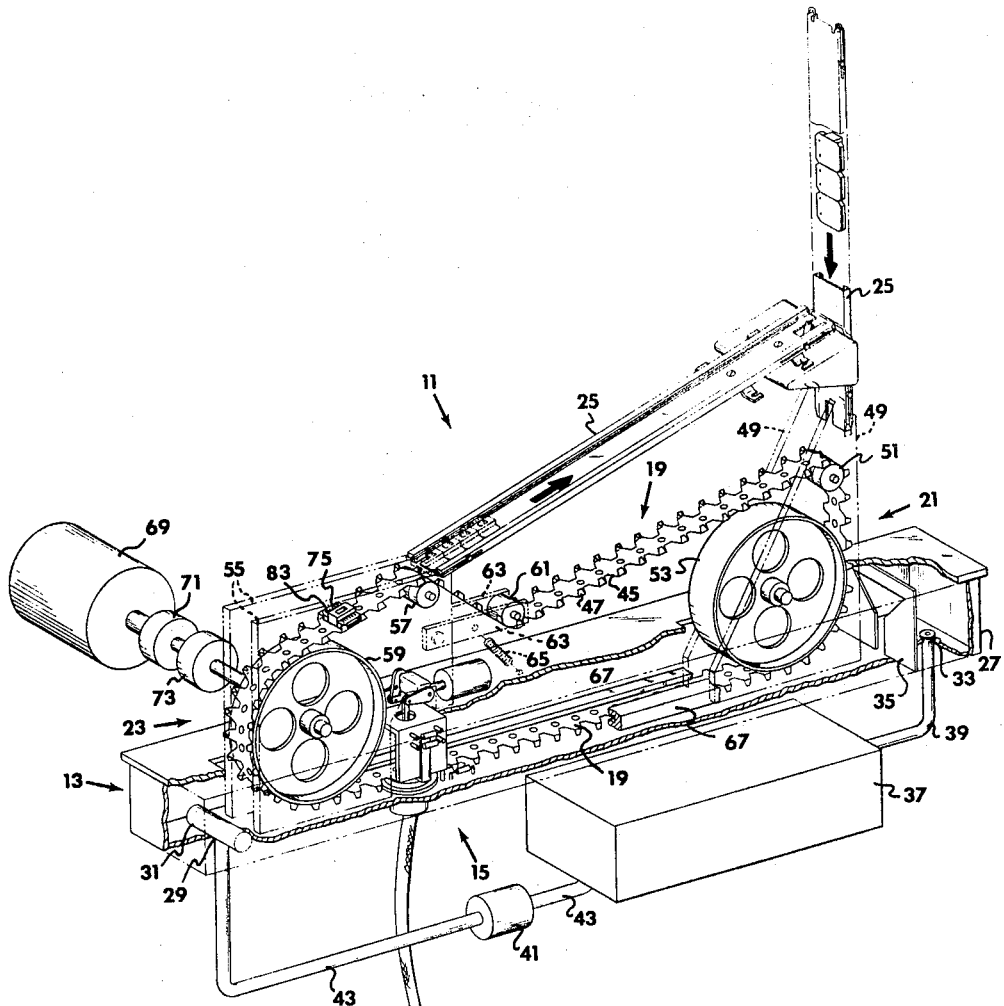
Fig. 1
Robert B. Ryan
INVENTOR
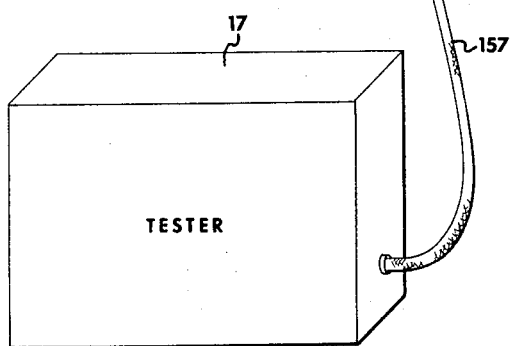
ATTORNEY

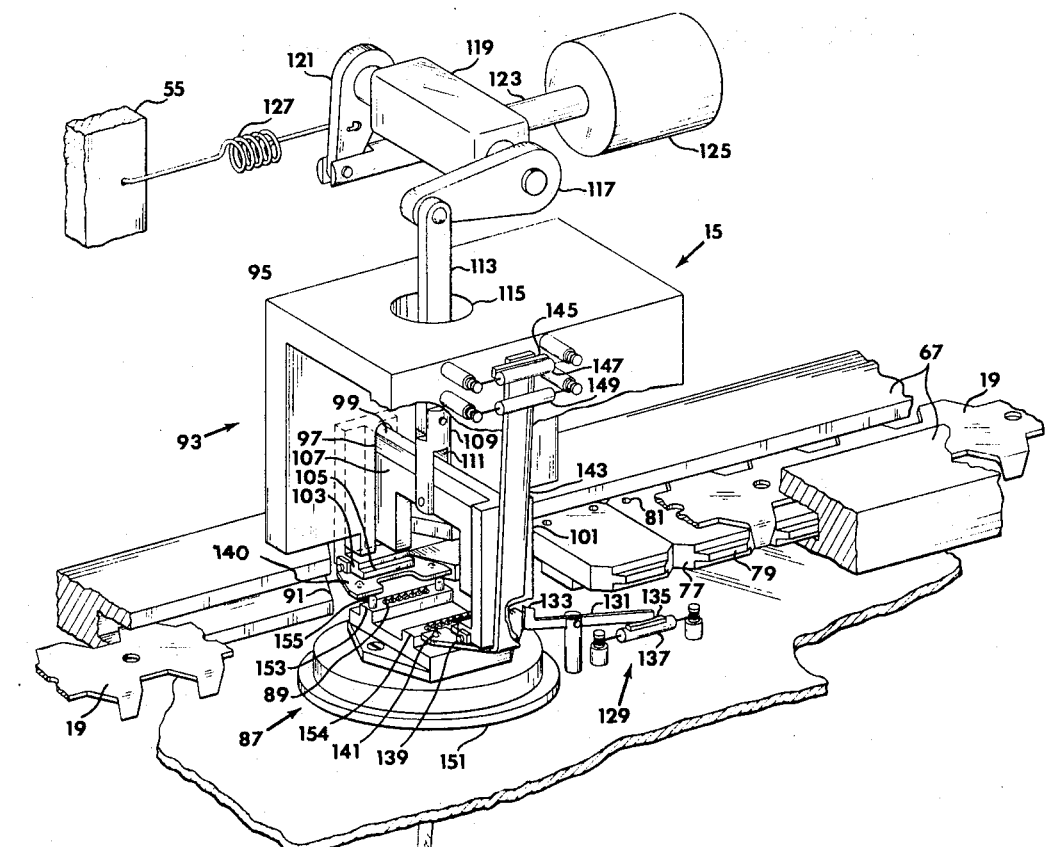
Fig. 2
Robert B. Ryan
INVENTOR
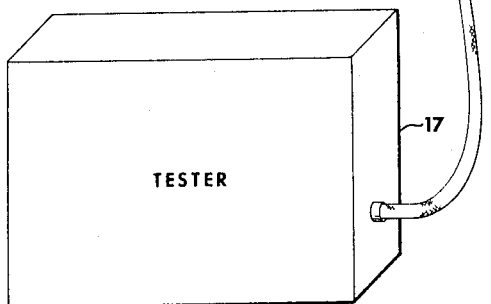

Robert B. Ryan
INVENTOR

ATTORNEY ically tested packaged integrated circuits in a controlled temperature environment.

TESTING ARRANGEMENT

This is a continuation of application Ser. No. 744,804, filed July 15, 1968, and now abandoned.

This invention relates to a test apparatus with a test head having a plurality of contacts adapted to engage the leads of a packaged integrated circuit and which may suitably be used with an apparatus for automatically testing packaged integrated circuits in a controlled temperature environment.

In the automatic testing of packaged integrated circuits, it is necessary to quickly and reliably effect an electrical connection between the leads of the packaged integrated circuit and the contacts of a test head which is electrically connected to a tester capable of applying selected electrical signals to selected contacts and measuring the result thereof to determine the electrical characteristics of the integrated circuit. However, such an electrical connection is not always easily and reliably achieved, because the test head contacts and the packaged integrated circuit leads may, during the course of time, become oxidized, thereby placing an undesirable impedance of variably unpredictable value between the packaged integrated circuit lead and the test head contact, which impedance interferes with the electrical connection and affects the accuracy of the electrical tests.

Accordingly, it is a feature of this invention to provide a test apparatus with a test head that minimizes the impedance caused by the presence of oxide film on the surface of either or both the test contacts or the packaged integrated circuit leads.

It is another feature of the present invention to provide a test head having a plurality of contacts adapted to engage the leads of a packaged integrated circuit in a manner that reliably and easily achieves an electrical connection between the test head contacts and the packaged integrated circuit leads.

In accordance with the present invention, there is provided a test apparatus with a test head having a plurality of contacts adapted to be engaged by the leads of a packaged integrated circuit and which are individually electrically connected to a tester capable of applying selected electricaly signals to selected contacts and sensing the result thereof to determine the electrical characteristics of a packaged integrated circuit. The test head contacts are adapted to be displaced laterally, relative to the direction of motion of a packaged integrated circuit being placed on the test head, in a manner that produces a wiping motion which removes or materially reduces an oxide film from the surfaces of either or both the packaged integrated circuit leads or test head contacts to reliably achieve an electrical connection with a minimum impedance therebetween.

Still other objects, features, and attendant advantages will become apparent to those skilled in the art from a reading of the following detailed description of a preferred physical embodiment constructed in accordance with the invention, taken in conjunction with the accompanying drawings, wherein:

FIG. 1 is a schematic orthographic illustration of an environmental test chamber, transport apparatus and tester for testing a plurality of packaged integrated circuits.

FIG. 2 shows the test assembly of the transport apparatus which places packaged integrated circuits on a test heat to enable a test operation to be performed.

Figure 3:
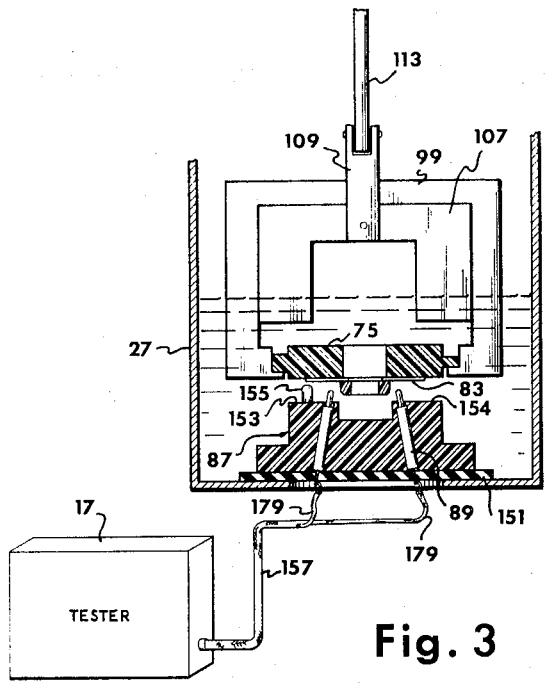
FIG. 3 shows a cutaway view of a test head constructed according to the present invention and having a pair of resiliently biased test contacts extending towards each other and adapted to engage the leads of a packaged integrated circuit positioned above the test head.

Referring generally to the figures of the drawings, in FIG. 1 is shown schematically a test apparatus, generally indicated at 11, for automatically testing a plurality of packaged integrated circuits and with which the present invention may be suitably employed. The test apparatus 11 includes an environmental test chamber, generally indicated at 13, having a test station, generally indicated at 15, disposed therein and electrically connected to a tester 17 capable of performing a testing process upon a packaged integrated circuit at the test station 15. Mounted in the environmental test chamber 13 is an endless transport tape, generally indicated at 19, which is adapted to carry packaged integrated circuits from an input section, generally indicated at 21, to an output section, generally indicated at 23. At the input section 21, a series of packaged integrated circuits are fed from a loaded magazine 25 onto the transport tape 19 which carries them through the environmental test chamber 13 and past the test station 15 where they each undergo a testing process by the tester 17 to the output section 23 where they are collected into an empty magazine 25.

The environmental test chamber 13 includes a tank 27 adapted to hold a fluid bath and having a fluid inlet 29 at one end of the tank 27 with a fluid distributing head 31 attached thereto, a drain 33 at the opposite end of the tank 27 and a slotted weir 35 mounted therebetween for controlling the level of a liquid bath in the tank 27. External to the tank 27 is a reservoir 37 of temperature controlled fluid which is connected by a conduit 39 to the drain 33, and to the fluid inlet 29 by a pump 41 and conduit 43. During the operation of the test apparatus 11, the temperature controlled fluid is circulated from the reservoir 37 to the tank 27 by means of the pump 41. The fluid bath may be a suitable nonconductive, substantially non-reactive, low residue fluid having a wide liquid temperature range of approximately −55° C to +150° C, and may preferably be a fluorocarbon compound such as Freon E3 or Freon E4 or a mixture thereof.

The endless transport tape 19, which moves between the input section 21 and the output section 23, is formed with a series of integrally spaced lateral protrusions 45 that are bent and folded to form upwardly protruding ears 47 which are adapted to hold packaged integrated circuits therebetween. The input section 21 is at the drain end of the tank 35 and is formed by a pair of schematically illustrated parallel plates 49 having an idler wheel 51 and an idler drum 53 rotatably mounted therebetween with the former being mounted above the latter. The output section 23 is at the inlet end of the tank 27 and is formed by a pair of parallel plates 55 having an idler wheel 58 and a drive drum 59 rotatably mounted therebetween with the former being mounted above and to the right of the latter. A tension idler wheel 61, which serves to keep the transport tape 19 taut, is rotatably mounted between a pair of parallel arms 63 which are pivotally attached to the parallel plates 55 and resiliently biased by a spring 65. Between the input section 21 and the output section 23 are a pair of parallel guide plates 67 which keep the packaged integrated circuits on the transport tape 19 while they pass through the environmental test chamber 13. The endless transport tape 19 is wrapped over the idler wheel 51 at the input section 21, down and under the idler drum 53, through the guide plates 67, under and around the drive drum 59, up and over the idler wheel 57 at the output section 23, under the resiliently biased tension idler wheel 61 and back to the idler wheel 51 at the input section 21. A continuously running motor 69 is connected through an electrically actuated clutch 71 and brake 73 to the drive drum 59 and serves to move the endless transport tape 19 through the environmental test chamber 13.

On the transport tape 19 at the discharge section 23 is a typical conventional carrier-packaged flat pack type integrated circuit assembly, generally indicated at 75, which map be transported, temperature conditioned, and tested according to the present invention. The overall carrier package assembly including the integrated circuit assembly carrier thereby, is generally referred to herein as a packaged integrated circuit, and has a generally rectangular configuration with beveled corners 77 and laterally protruding lugs 79 on each side and a pair of indexing holes 81 on one side. The flat pack type integrated circuit 75 is mounted in such a manner that the connected terminals 83 of the flat pack circuit, which extend laterally in opposite directions, are disposed in an exposed position by separator guides 85 on one surface of the carrier package assembly on either side of a protruding portion of the carrier package which serves to protect the central physical body of the flat pack circuit. In some instances one of the laterally protruding lugs 79 may be thicker than the other to distinguish one set of integrated circuit terminals from the other.

In the illustrative embodiment, the test station 15, where a packaged integrated circuit undergoes a test operation by the tester 17, as more particularly shown in FIG. 2, is mounted in the tank 27 between the input section 21 and the output section 23. The test station 15 includes a test head, generally indicated at 87, having a plurality of contacts 89 electrically connected to the tester 17 which is mounted below an open cutout section 91 of the parallel guide plates, and a test assembly, generally indicated at 93, which is mounted above the open cutout section 91 and adapted to place a packaged integrated circuit 75 onto the test head 87 to enable the test operation to be performed. The test assembly 93 includes a housing 95, mounted on the guide plates 67, having a top and two sides and which partially extend into the open cutout section 91 of the guide plates 67. In each side of the housing 95 is an upwardly extending slot 97 which serves as a vertical guide for a U-shaped bracket 99 disposed inside the housing 95 of the test assembly 93. The U-shaped bracket 99 extends through the vertical slots 97 in each side of the housing 95 and has a flange 101 on the outside edge thereof to insure proper horizontal alignment with the housing 95. On the bottom of each end of the U-shaped bracket 99 is an inwardly extending foot 103 which serves to support a packaged integrated circuit 75 positioned at the open cutout section 91 and has a channel 105 formed therein adapted to be engaged by the lug 79 on the edge of a packaged integrated circuit 75.

Disposed inside the U-shaped bracket 99 is a clevis 107, the ends of which are adapted to engage the upper portion of the inwardly extending feet 103 of the U-shaped bracket 99 and the surface of a packaged integrated circuit 75. Fastened to the clevis 107 is a rod 109 having a slot 111 formed therein which is adapted to contain the horizontally extending portions of the U-shaped bracket 99 and the clevis 107. The opposite end of the rod 109 is bifurcated and pivotally connected to an arm 113 which extends upwardly through a hole 115 formed in the top of the housing 95 and is pivotally connected to a cam 117. The cam 117 is rotatably connected through a bearing 119 to another cam 121 which is pivotally connected to the bifurcated end of a plunger 123 of a solenoid 125. Both the clevis 107 and the U-shaped bracket 99 are resiliently biased upwardly by a spring 127 which is connected between the cam 121 to which the plunger 123 is pivotally connected and one of the parallel plates 55 of the output section 23.

In the illustrative embodiment the movements of a packaged integrated circuit 75 at the test station 15 as well as the initiation of the operation 0f the tester 17 are controlled by magnetically actuated reed switches which form part of an electrical sensing and control circuit which is described in prior U. S. Patent application Ser. No. 660,673. The reed switches are actuated by magnets connected to the mechanical sensors which are responsive to the movements and positions of the packaged integrated circuits as they are carried through the test station 15. Immediately in front of the test head 87 is an incoming packaged integrated circuit sensor, generally indicated at 129, which conditions the test apparatus 11 for performing a test operation in response to a packaged integrated circuit being carried into the open cutout section 91 by the transport tape 19. The incoming sensor 129 includes a pivotally connected arm 131 an upwardly protruding finger 133 at one end which is adapted to be engaged by an incoming packaged integrated circuit and a magnet 135 at the opposite end which is normally in actuating proximity with a magnetically actuated reed switch 137 and maintains it in a first electrical condition. When an incoming packaged integrated circuit engages the upwardly protruding finger 133, the magnet 135 is pivoted out of actuating proximity from the reed switch 137 and changes it to a second electrical condition which conditions the test apparatus 11 for testing the incoming packaged integrated circuit.

Pivotally connected to the bottom of each inwardly extending foot 103 of the U-shaped bracket 99 and resiliently biased upward is a shoe assembly 139 having upwardly protruding nipples 141 which are adapted to be engaged by a packaged integrated circuit carried onto the inwardly extending feet 103 by the transport tape 19. One shoe assembly 139 has an arm 143 integrally connected thereto with a magnet 145 on the end thereof which extends upwardly in the direction of two magnetically actuated reed switches 147 and 149. The reed switch 147 is interconnected with the reed switch 137 in a controlling relation with the electrically actuated clutch 71, brake 73 and solenoid 125 and is normally actuated by the magnet 145 but is inoperative until the test apparatus is conditioned for testing by the de-actuation of the reed switch 137. The reed switch 149 is connected in controlling relation with the tester 17 and is normally unactuated by the magnet 145.

When a packaged integrated circuit is carried past the incoming sensor, which conditions the test apparatus 11 for testing, and onto the inwardly extending feet 103 of the U-shaped bracket 99, it presses against the nipples 141 of the shoe assemblies 139 and 140 and pivots the magnet 145 out of actuating proximity with the reed switch 147 to prevent it from de-actuating the clutch 71 and actuating the brake 73. When the packaged integrated circuit is properly positioned on the feet 103 of the U-shaped bracket 99 between the nipples 141 of the resiliently biased shoe assemblies 139 and 140, it no longer engages the nipples 141 and accordingly the magnet 145 is pivoted back into actuating proximity within the reed switch 147 which de-actuates the clutch 71 and actuates the brake 73 to stop the movement of the transport tape 19 and also actuate the solenoid 125 to place the packaged integrated circuit on the test head 87. The downward movement of the U-shaped bracket 99 moves the magnet 145 into actuating proximity with the reed switch 149 which initiates the operation of the tester 17. Upon completion of the test operation, the packaged integrated circuit is returned to the transport tape 19 which then carries the packaged integrated circuit away from the test station 15 to the output section 23 where it is collected in an empty magazine 25. The details of the control circuit for operating the test apparatus 11 do not constitute part of the present invention and accordingly no further discussion regarding them is deemed necessary.

The test head 87, mounted below the open cutout section 91 of the guide plates 67 is constructed from a suitable electrically non-conductive material and is disposed in fluid sealing relation to the bottom wall of the tank 27 by means of a rubber seal 151. The top of the test head 87 has a pair of upwardly protruding parallel rails 153 and 154 extending thereacross in the same direction as the guide plates 67 and which are spaced sufficiently apart with a sufficient height to accommodate the protruding portion of a packaged integrated circuit 75 therebetween. In each rail 153 and protruding through the surface thereof are a plurality of upwardly extending and resiliently biased test contacts 89 constructed from a suitable electrically conductive material and which are properly positioned to engage the downwardly exposed terminals 83 of a packaged integrated circuit 75. A pair of guide pins 155 attached to one of the rails 153 are adapted to engage the holes 81 in a packaged integrated circuit 75 to properly position it on the test head 87. The test contacts 89 are electrically connected by a cable 157 to the tester 17 whereby selected electrical signals can be applied to selected test contacts 89 to determine the electrical characteristics of a packaged integrated circuit 75 properly positioned on the test head 87 and engaging the test contacts 89.

In the past, considerably difficulty has been experienced in easily effecting a reliable electrical connection between the tester 17 and the packaged integrated circuit 75, because the surfaces of test head contacts 89 as well as the packaged integrated circuit leads 83 tend to become oxidized during the course of time and have an oxide film formed thereon. The presence of an oxide film on the surfaces of the leads 83 and contacts 89 interferes with the reliability of the electrical connection and places an undesirable impedance between the tester 17 and the packaged integrated circuit 75 that undesirably affects the accuracy of the tests performed on the integrated circuit.

From the foregoing, it will be appreciated that it is desirable to provide some means for removing any oxide film from the surfaces of either or both the test head contacts 89 or the leads 83 of a packaged integrated circuit to be tested or at least materially reducing such film to a relatively insignificant quantity. It has been found that substantial and material removal or reduction of the oxide film can be achieved by providing a test head 87 having contacts 89 adapted to produce a wiping action by which the oxide film is scraped or rubbed off. A preferred embodiment of a test head 87 constructed in accordance with the invention is shown in cross-sectional view in FIGS. 3 and 4. Resiliently biased contacts 89 are disposed in the test head 87 and protrude through the surfaces of the parallel rails 153 and 154 towards each other so that when they are engaged and depressed by a packaged integrated circuit being placed on the test head 87, the ends of the test contacts 89 will be laterally displaced, relative to the direction of motion of the packaged integrated circuit, and produce a wiping motion in two oppositely lateral directions respectively on the two oppositely lateral sets of packaged integrated circuit leads 83.

Figure 5:
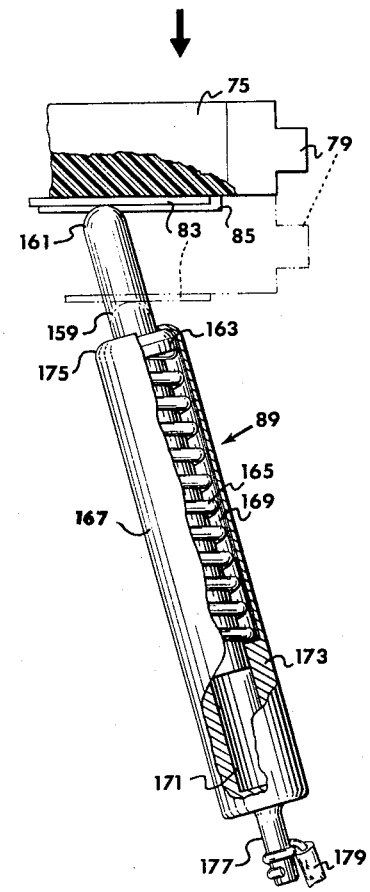
FIG. 5 shows one of the resiliently biased test contacts disposed in a test head constructed in accordance with the present invention and the lateral displacement that the spherical end of the contact undergoes as it is depressed by a packaged integrated circuit being placed thereon.

As more fully illustrated in FIG. 5, each test contact, generally indicated at 89, includes a cylindrical test pin 159 having a spherical end 161 adapted to engage a packaged integrated circuit lead 83 and an annular flange 163. The test contact pin 159 is disposed in a spiral spring 165, the outer diameter of which is substantially equal to the outer diameter of the annular flange 163. Both the spring 165 and the test pin 159 are disposed inside a cylindrical casing 167 having closed bottom and two coaxial bores 169 and 171 formed therein and interconnected by an annular shoulder 173 with the larger diameter bore being formed at the open end of the casing 167. The test contact pin 159 is adapted to be disposed in the smaller diameter bore 171 in an easy slidable fit while the annular flange 163 and the spiral spring 165 are adapted to be disposed in the larger diameter bore 169 in an easy slidable fit with the opposite ends of the spiral spring 165 engaging the annular flange 163 and the annular shoulder 173 interconnecting the coaxial bores 169 and 171. The spiral spring 165 is compressed in the large diameter bore 169 of the casing 167 by an annular crimp 175 formed at the open end of the cylindrical casing 167 which engages the annular flange 163 formed on the test contact pin 159. A small integrally connected shaft 177 is formed on the closed bottom of the casing 167 which protrudes in fluid sealing relation through the seal 151 and is electrically connected to the tester 17 by means of a lead wire 179 which forms part of the cable 157.

Figure 4:
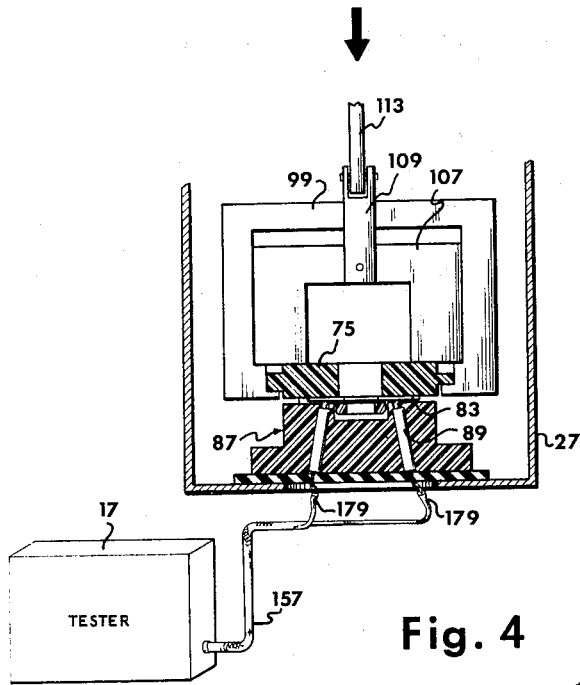
FIG. 4 shows a cutaway view of a test head constructed according to the present invention with a packaged integrated circuit placed thereon and with the leads of the integrated circuit engaging the test contacts which are connected to a tester adapted to perform electrical tests on the integrated circuit.

Normally, when the test contacts are not engaged by a packaged integrated circuit, as shown in FIG. 3, the upwardly resiliently biased test pins 159 of the test head contacts 89 protrude upwardly through the surfaces of the parallel rails 153 and 154 and towards each other so that the spherical ends 161 of the test pin 151 are disposed in a first position. However, when the clevis presses the packaged integrated circuit 75 onto the test head 87, as shown in FIG. 4, the leads 83 engage the spherical ends 161 of the resiliently biased contact pins 159 and laterally displaces them in two directions relative to the direction of motion of the packaged integrated circuit to a second position. The lateral displacement of the spherical end 161 from the first position to the second position produces a wiping motion in which the spherical end 161 of the contact pin 159 scrapes or rubs away an oxide film, or at least materially reduces such film to a relatively insignificant quantity, which may be present on either the packaged integrated circuit lead 83 of the spherical end 161 of the contact pin 159 itself to provide an electric connection therebetween of superior reliability, with minimum impedance which improves the accuracy of the test operation.

In operation, a quantity of temperature-controlled fluid is pumped from the reservoir 37 to the tank 27 until the level of the liquid bath is such that the amount of fluid entering the tank 27 from the distributing head 31 is equal to the amount of fluid flowing through the slotted weir 35 and being drained back into the reservoir 37. A series of packaged integrated circuits 75 are fed from a loaded magazine 25 at the input section 21 onto the transport tape 19 which carries them into the liquid bath along a temperature-conditioning and stabilizing path formed by the parallel guide plates 67 to the test station 15. As each packaged integrated circuit 75 enters the test station 15, it engages the upwardly protruding finger 133 of the incoming sensor 129 which pivots the magnet 135 away from the magnetically actuated reed switch 137 to condition the testing apparatus 11 for testing the incoming packaged integrated circuit 75. As each packaged integrated circuit 74 is carried onto the inwardly extending feet 103 of the U-shaped bracket 99, it engages the upwardly protruding nipples 141 of the shoe assemblies 139 and 140 which pivots the magnet 145 on the end of the integrally connected arm 143 out of actuating proximity with the reed switch 147. When the packaged integrated circuit is properly positioned on the inwardly extending feet between the upwardly protruding nipples 141, the magnet 145 is pivoted into actuating proximity with the reed switch 147 which de-actuates the clutch 71 and actuates the brake 73 to stop the movement of the transport tape 19 and also actuates the solenoid 125 to press the clevis 107 downward to place the packaged integrated circuits on the test head 87.

As the packaged integrated circuit 75 is placed on the test head 87, the leads 83 engage the spherical ends 161 of the dual rows of resiliently biased contact pins 159 at a respective first position and press them downwardly into their cylindrical casings 167 to a respective second position. The movement of the ends 161 of the test pins 159 from a respective first position to a respective second position causes the spherical ends 161 to be displaced laterally in two directions relative to the direction of motion of the packaged integrated circuit. The displacement of the spherical ends 161 of the dual rows of contact pins 159 laterally in two opposite directions produces a wiping action which scrapes or rubs away an oxide film, or at least materially reduces such film to a relatively insignificant quantity, which may be present on either the packaged integrated circuit leads 83 or the spherical ends 161 of the contact pins 159 to effect an electrical connection of superior reliability with minimum impedance to desirably improve the accuracy of the testing process.

As the packaged integrated circuit 75 is placed on the test head 87, the magnet 145 on the end of the arm 143, which is integrally connected to the shoe assembly 139 attached to the bottom of the inwardly extending foot 103, is brought into actuating proximity with the reed switch 149 which initiates the operation of the tester 17 whereby selected electrical signals are applied to selected test contacts 89 and the results thereof sensed to determine the electrical characteristics of the particular packaged integrated circuit 75 engaging the dual rows of test contacts 89. Upon completion of the test operation, the solenoid 125 of the test assembly 93 is de-actuated and the resiliently biased force provided by the spring 127 attached to the cam 121 causes the U-shaped bracket 99 to be lifted upward, thereby removing the packaged integrated circuit 75 from the test head 87 and placing it back onto the transport tape 19. When the packaged integrated circuit 75 is again placed upon the transport tape 19, the movement of the transport tape 19 is resumed to carry the packaged integrated circuit 75 from the test station 15, out of the liquid bath, to the output section 23 where it is collected into an empty magazine 25. This process is repeated for each of the series of packaged integrated circuits 75 fed from the loaded magazine 25 at the input section 21 onto the transport tape 19.

While the invention has been illustrated and described with respect to a single illustrative and preferred emobdiment it will be apparent to those skilled in the art that various embodiments, modifications and improvements may be made without departing from the scope and spirit of the invention. Accordingly, it is to be understood that the invention is not to be limited by the illustrative embodiment, but only by the scope of the appended claims.

That which is claimed is:

1. The method of testing an electrical circuit assembly comprising the steps of:
    submerging an electrical circuit assembly in a confined non-conductive liquid bath and transporting it along a conditioning and stabilizing path within said bath to a first selected position,
    stopping the movement of the electrical circuit assembly along the path at the first selected position and transversely moving the electrical circuit assembly from the conditioning and stabilizing path to a second selected position within said bath where it can be tested,
    engaging a plurality of movable electrical test contacts in a stationary mount therefor and which is stationarily submerged within said liquid bath and substantially rigidly secured to a containing wall for such liquid bath, and simultaneously laterally moving the ends of said contacts in two directions relative to the direction of motion of the integrated circuit assembly while holding said mount substantially stationary to effect an electrical connection therebetween,
    testing the electrical circuit assembly while at said second position and in engagement with said test contacts, and removing the electrical circuit assembly from said second selected position and laterally returning it to said conditioning and stabilizing path at said first selected position and resuming movement of the electrical circuit assembly along said path in a direction away from said selected position.

2. The method of testing an electrical circuit assembly as defined in claim 1:

said plurality of contacts being arranged in dual rows of opposite pairs in said stationary mount with the ends thereof being each displaced from a respective first position to a respective second position in opposite lateral directions to produce dual laterally opposite wiping motions upon engagement with the leads of a packaged electrical circuit.

3. Apparatus for testing packaged electrical circuits having a plurality of leads protruding laterally from the package:

a conditioning container adapted to contain a liquid bath therein, a test head mounted substantially rigidly within said container and within the liquid bath volume area therein, said test head having a substantially stationary body and substantially rigidly secured to a containing wall for such liquid bath with a plurality of test contacts partially disposed in said body and adapted to engage the leads of a packaged electrical circuit, a tester electrically connected to the contacts of said test head and adapted to apply and sense the result of selected electrical signals at selected contacts of said test station to test a packaged electrical circuit engaging the contacts, conveyor means for conveying packaged electrical circuits through said liquid bath and along a linear continuing path therethrough past a transfer zone adjacent to and laterally spaced from said test head, means to transversely move a packaged electrical circuit transversely of and from and to said linear path at said transfer zone toward said test head and to effect engagement of the leads of the packaged electrical circuit with the contacts of said test head to enable a test operation to be performed upon the packaged electrical circuit by said tester, and said test contacts being resiliently biased and protruding upwardly from said test head at an angle inclined to the normal thereof and with the ends of said test contacts adapted to be engaged and laterally displaced into said test head position from a quiescent position by the leads of a packaged electrical circuit pressed against said test head to effect a lateral wiping motion along the leads of the packaged electrical circuit.

4. Apparatus for testing packaged electrical circuits according to claim 3:

said test contacts being arranged in dual rows of oppositely upwardly protruding spaced pairs and of contacts having ends adapted to be engaged by the leads of a packaged integrated circuit and displaced in laterally opposite directions away from each other.

5. Apparatus for testing a packaged electrical circuit according to claim 4:

the ends of said contacts which are adapted to be engaged by the leads of a packaged integrated circuit having a rounded shape which has a camming surface for engaging the leads of a packaged electrical circuit, and said test head having a recess formed between said dual rows of contacts.

6. According to claim 5, wherein said test contacts comprise:

a housing adapted to be connected to an electrical conductor and having a bore formed therein with an open crimped end, a test contact pin partially disposed in the bore of the housing and having a flange formed thereon adapted to engage the inner portion of the crimped end of the housing, and a spring disposed in the bore of the housing around the test contact pin with opposite ends contacting respectively the flange portion of the test contact pin and the base of the bore to resiliently bias said contact pin from the bore of said housing through the open end.

* * * * *